(12) United States Patent
Konishi et al.

(10) Patent No.: US 7,446,285 B2
(45) Date of Patent: Nov. 4, 2008

(54) FOODSTUFFS PROCESSING APPARATUS WITH MEMO INFORMATION DEVICE

(75) Inventors: Hiroe Konishi, Ritto (JP); Yukari Uchida, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 1157 days.

(21) Appl. No.: 10/485,868

(22) PCT Filed: Apr. 7, 2003

(86) PCT No.: PCT/JP03/04414

§ 371 (c)(1),
(2), (4) Date: Feb. 5, 2004

(87) PCT Pub. No.: WO03/091673

PCT Pub. Date: Nov. 6, 2003

(65) Prior Publication Data

US 2005/0039614 A1    Feb. 24, 2005

(30) Foreign Application Priority Data

Apr. 24, 2002 (JP) .............................. 2002-121888

(51) Int. Cl.
*G01G 19/387* (2006.01)
*B02C 25/00* (2006.01)
(52) U.S. Cl. .................... 219/506; 219/720; 99/325; 99/451

(58) Field of Classification Search .................. 219/506, 219/720, 702; 99/451, 325
See application file for complete search history.

(56) References Cited

U.S. PATENT DOCUMENTS

| 6,064,050 A * | 5/2000 | Ishikawa et al. ............. 219/720 |
| 2004/0093265 A1 * | 5/2004 | Ramchandani et al. ........ 705/14 |

FOREIGN PATENT DOCUMENTS

| JP | 59-046517 A | 3/1984 |
| JP | 62-103524 A | 5/1987 |
| JP | 04-184387 A | 7/1992 |
| JP | 04-264220 A | 9/1992 |

* cited by examiner

*Primary Examiner*—Philip H Leung
(74) *Attorney, Agent, or Firm*—Global IP Counselors, LLP (57) ABSTRACT

The present invention provides a combination weighing apparatus (1) capable of eliminating the need for memo paper for messages and reminders. A memory (22) of a control unit (20), which comprehensively controls the operation of the combination weighing apparatus (1), is provided with a memo information storage unit (22b) that stores memo information. In addition, the control unit (20) is provided with a retrieval control unit (21a) that retrieves memo information stored in the memo information storage unit (22b), and a display control unit (21b) for displaying the memo information retrieved by the retrieval control unit (21a). Furthermore, a touch screen (30), which is a memo information input means for inputting memo information, is connected, capable of sending and receiving signals, to the control unit (20).

6 Claims, 7 Drawing Sheets

| MEMO NO. | INPUT TIME | INPUTTER CODE | OPERATION LEVEL | PRESET NO. | RECIPIENT CODE | MEMO INFORMATION | OPERATION DISABLED FLAG |
|---|---|---|---|---|---|---|---|
| 0001 | 0201221708 | 999999 | Z | | | THERE'S A SPACER IN THE FIRST CORNER BECAUSE OF HORIZONTAL EJECTION. | 0 |
| 0002 | 0201231815 | 999999 | Z | | | CONNECT INTERLOCK WIRE FROM PACKAGING MACHINE TO PORTS 5, 6. | 0 |
| 0003 | 0202121756 | 123456 | X | 4 | | ZERO POINT ERROR OCCURRED. FOODSTUFFS STUCK TO INSIDE OF WH… | 0 |
| 0004 | 0202131800 | 123456 | X | 4 | 234567 | FELL 500 BAGS SHORT OF PLAN. NEED TO SPEED UP PRODUCTION. | 0 |
| 0005 | 0202191805 | 234567 | X | 3 | 123456 | EXCEEDED PLAN BY 300 BAGS. NEED TO SLOW DOWN PRODUCTION. | 0 |
| 0006 | 0202211852 | 234567 | X | 2 | | DISPERSION FEEDER STRENGTH SHOULD BE REDUCED. | 0 |
| 0007 | 0202220622 | 123456 | X | 2 | 234567 | WEIGH HOPPER #5 OPENS LATE. NEEDS ADJUSTMENT. | 0 |
| 0008 | 0202260555 | 345678 | X | 2 | 456789 | 0202260555.JPG. | 0 |
| 0009 | 0202281805 | 567890 | Y | 2 | | CHANGED UPPER LIMIT TO 3 GRAMS. | 0 |
| 0010 | 0203061800 | 234567 | X | 2 | 123456 | OVERLOAD ERROR OCCURRED. TO WEIGH HOPPER … | 1 |

FOODSTUFFS PROCESSING APPARATUS WITH MEMO INFORMATION DEVICE

FIELD OF THE INVENTION

The present invention relates to an apparatus for foodstuffs processing, such as weighing, packaging, and inspecting.

RELATED ART

As an example of the related art, combination weighers used for automatic weighing of foodstuffs, such as snacks and candies, are provided with numerous weigh hoppers. Therein, a pool hopper is arranged above each weigh hopper, foodstuffs are dispersed and fed, via the pool hoppers, into the respective weigh hoppers where they are weighed, and a combination calculation is performed based on the weight values thereof. Further, the combination weigher selects the combination whose weight equals the target weight or is closest thereto within an allowable range, discharges the foodstuffs only from the weigh hoppers corresponding to this optimal combination, thereby obtaining a weight of products equal to or closest to the target weight.

From the perspective of production efficiency, weighing operations using such combination weighers are performed in shifts, with a plurality of shift operators each handing over operation to the next operator at the end of their shift. Further, if an operator is unable to hand over operation to the next operator in person, but has a message to give to the next operator regarding the condition of the apparatus or the status of work progress, and the like, then the operator may stick a memo sheet containing such details on the operation unit of the apparatus where it will be seen by the next operator when they operate the apparatus. In addition, even if there is no message to be given to the next operator, memo sheets are still stuck onto the operation unit as reminders for oneself. These actions help promote the continuity of smooth production activities by ensuring handover between operators is performed without fail, and that operators themselves do not forget anything.

However, using the aforementioned method, e.g., sticking memo sheets to the operation unit with adhesive tape and the like, invites blemishing of the operation unit due to the adhesive compound. On the other hand, memo sheets that combine suitable sticking and removal characteristics and that can be repeatedly affixed and removed are popular and in use. However, in such cases, rather than the comparatively minor blemishing of the operation unit, the problem is that the memo sheets peel off and get lost, and there is even a risk that the memo sheets will get mixed into the foodstuffs. In either case, the sticking of numerous memo sheets to the operation unit becomes visually unaesthetic, and their recorded content eventually becomes illegible, thus no longer serving their function as a memo sheet.

DISCLOSURE OF THE INVENTION

It is an object of the present invention to provide a foodstuffs processing apparatus capable of eliminating the need for memo paper for messages and memos.

First, the present invention as recited in the first aspect of the present invention is a foodstuffs processing apparatus that performs prescribed processing related to foodstuffs. The present foodstuffs processing apparatus comprises: a memo information storage means that stores memo information; a memo information input means for inputting the memo information; a memo information retrieval means that retrieves the memo information stored in the memo information storage means; and a memo information display means that displays the memo information retrieved by the memo information retrieval means.

The present invention eliminates the need to stick conventional sticky-type memo sheets onto the operation unit, and the like, making it possible to convey information between the inputter and reader of memo information, without degrading aesthetics, and to prevent a lapse in memory of the inputter themselves. Further, there is no risk of losing the memo sheet or of the memo sheet mixing into foodstuffs. The present invention is advantageous if, for example, a shift work system is introduced and handover between shifts cannot be done in person.

Next, the invention as recited in the second aspect of the present invention is the foodstuffs processing apparatus as recited in the first aspect, wherein the memo information input means has a character code input function and a handwriting input function.

According to the present invention, the inputter, when inputting memo information, can select a character code input function and a handwriting input function, thereby enhancing convenience. The present invention makes it possible to easily convey information, particularly if using the handwriting input function, between people who, for example, can only recognize a specific language. Furthermore, in such cases, the present invention is also advantageous from the perspective of cost because it is unnecessary to provide a function for inputting and displaying the specialized language.

In addition, the invention as recited in the third aspect of the present invention is the foodstuffs processing apparatus as recited in the first or the second aspect, wherein the memo information storage means associates and stores as the memo information the time, error symptoms, error cause, error handling status, and apparatus state after error handling.

According to the present invention, if the inputter of memo information principally inputs visual information of the apparatus, then the reader of the memo information can read the memo information while facing the foodstuffs processing apparatus. Because the memo information relates to error information of the foodstuffs processing apparatus, the effectiveness in conveying that information is enhanced.

In addition, the invention as recited in the fourth aspect of the present invention is the foodstuffs processing apparatus as recited in the third aspect, wherein the memo information storage means associates and stores the memo information and post-error-handling operation enable/disable information. In addition, the foodstuffs processing apparatus is further provided with an operation restricting means that restricts operation if operation disabled information is stored.

According to the present invention, if the inputter of the memo information judges, after error handling, that the foodstuffs processing apparatus should not be operated and inputs operation disabled information, then the operation restricting means restricts the operation of the foodstuffs processing apparatus, thus avoiding further abnormal operation of the foodstuffs processing apparatus.

In addition, the invention as recited in the fifth aspect of the present invention is the foodstuffs processing apparatus as recited in any one of the first through fourth aspects, further provided with an operation inputting means. The operation inputting means is for inputting operation related to prescribed processing related to foodstuffs. The memo information storage means associates and stores the memo information and an operation level that specifies the range in which operations can be input in the operation inputting means. In addition, the memo information retrieval means retrieves memo information corresponding to the operation level.

According to the present invention, because the memo information retrieval means retrieves memo information corresponding to the operation level, and the memo information displaying means displays this specialized retrieved memo information, it is no longer tedious for the reader when reading memo information.

In addition, the invention as recited in the sixth aspect of the present invention is the foodstuffs processing apparatus as recited in any one of the first through fourth aspects, wherein the memo information storage means associates and stores the memo information and a preset number that specifies a foodstuffs item. In addition, the memo information retrieval means retrieves memo information corresponding to the preset number.

According to the present invention, because the memo information retrieval means retrieves memo information corresponding to a preset number, and the memo information displaying means displays that specialized retrieved memo information, it is no longer tedious for the reader when reading memo information.

Further, the invention as recited in the seventh aspect is the foodstuffs processing apparatus as recited in any one of the first through fourth aspects, wherein the memo information storage means associates and stores the memo information and an identifier that specifies a reader of the memo information. In addition, the memo information retrieval means retrieves the memo information corresponding to the identifier.

According to the present invention, the memo information retrieval means retrieves memo information corresponding to an identifier like the operator code of the reader, and the memo information displaying means displays that specialized retrieved memo information, and therefore it is no longer tedious for the reader when reading memo information.

In addition, if the inputter of memo information specifies a reader, e.g., if the inputter is an operator who inputs error information of the foodstuffs processing apparatus, and the reader is a maintenance engineer, then an extremely advantageous messaging means is provided.

PREFERRED EMBODIMENTS

The following explains the combination weigher according to the embodiments of the present invention.

Overall Configuration

Figure 1:
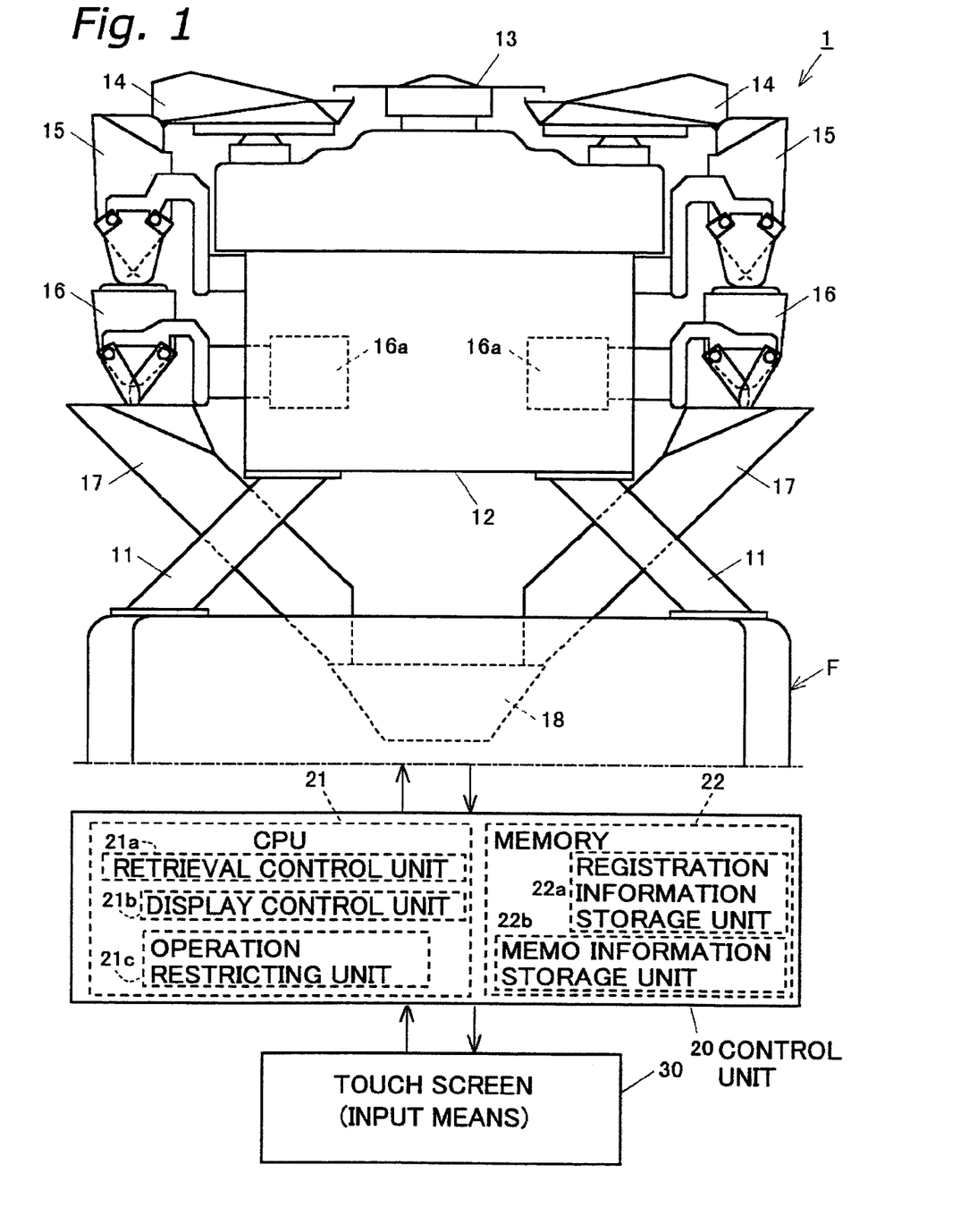
FIG. 1 is a schematic side view that depicts the overall configuration of the combination weigher.

As shown in FIG. 1, the present combination weighing apparatus 1 has a box-shaped main body case 12 supported by a plurality of support legs 11 on a frame F. Further, a dispersion table 13, which disperses foodstuffs like snacks and candies; a plurality of radial troughs 14 . . . 14, arranged radially around the circumference of the dispersion table 13; and a vertically arranged pair of pool hoppers 15 . . . 15 and weigh hoppers 16 . . . 16 provided for each of the radial troughs 14 . . . 14; and the like are installed on the main body case 12.

The foodstuffs fed into the combination weighing apparatus 1 are first dispersed evenly onto the radial troughs 14 . . . 14 by the dispersion table 13, then supplied from the radial troughs 14 . . . 14 to the weigh hoppers 16 . . . 16 via the pool hoppers 15 . . . 15, weighed by weight detectors 16a . . . 16a respectively coupled to each of the weigh hoppers 16 . . . 16, whereupon a combination calculation is performed.

Further, individual chutes 17 . . . 17 are respectively arranged below the weigh hoppers 16 . . . 16, and foodstuffs from the weigh hoppers 16 . . . 16 corresponding to the optimal combination as a result of a combination calculation are discharged to the individual chutes 17 . . . 17. The foodstuffs that were discharged and slid down through the individual chutes 17 . . . 17 are further supplied toward the downstream side to, for example, a packaging machine, via a funnel-shaped collection chute 18 arranged at the approximate center of the present combination weighing apparatus 1.

Control System

As shown in FIG. 1, the control system of the combination weighing apparatus 1 is provided with a control unit 20, which is a characterizing portion of the present invention, and that comprehensively controls the operation of the combination weighing apparatus 1. Further, a touch screen 30, which is likewise a characterizing portion of the present invention, is connected, capable of exchanging signals, to the control unit 20 as an operation input means for performing operations necessary to run the combination weighing apparatus 1, and as a memo information input means for inputting memo information.

The control unit 20 has a CPU 21 and a memory 22, and outputs a control signal that controls the discharge of foodstuffs from the pool hoppers 15 . . . 15 and weigh hoppers 16 . . . 16. In addition, the control unit 20 inputs weight signals from the weight detectors 16a . . . 16a, one each in each of the weigh hoppers 16 . . . 16, performs a combination calculation based on these weight signals, and selects the optimal combination comprising a weight that is equal to or closest within a permissible range to the target weight.

The memory 22 comprises a registration information storage unit 22a and a memo information storage unit 22b. The registration information storage unit 22a stores various data that is set and registered for each preset number, each preset number signifying a foodstuffs item; the operator code, name, operation password, and the like, of the person who will operate the touch screen 30. On the other hand, the memo information storage unit 22b stores inputted memo information. The memo information includes items like the state of the combination weighing apparatus 1, the work progress status, as well as messages passed between operators and items to prevent memory lapses of the operators themselves. However, the memo information is not limited thereto.

The touch screen 30 is provided proximate to the combination weighing apparatus 1. The touch screen 30 has a display screen like a liquid crystal display, and functions as an operation input means for inputting operations needed to run the combination weighing apparatus 1, and as an input means for inputting memo information and for inputting to perform various types of setup and registration. In addition, the touch screen 30 can display this information. The touch screen 30 is configured so that operations can be input by touching the display screen at a prescribed display location. In addition, the touch screen 30 has a character code input function and a handwriting input function when inputting the memo information.

Further, the CPU 21 is provided with a retrieval control unit 21a, a display control unit 21b, and an operation restricting unit 21c.

The retrieval control unit 21a of the CPU 21 is a retrieval means for retrieving various information, including memo information, from the memory 22, and can perform control so that, when retrieving memo information stored in the memo information storage unit 22b, the memo information is retrieved in accordance with the operation level, the preset number, or the operator code of the reader.

Because the operation level specifies a range of available key operations in the touch screen 30, it is customary to set the operation level generally in accordance with the assigned duties of the person operating the touch screen 30. In one example, the operation level is partitioned into a "working level," an "administration level," and an "installation adjustment level." This example is in superordinate order. Mainly, the person to perform operation in the "working level" is the operator, and the operation details of the "working level" correspond to the basic operations in the performance of daily work, e.g., including keying operations related to operation, zero adjustment, and the like. The person to perform operation in the "administration level" is the system administrator. The operation details of the "administration level" correspond to, in addition to those of the aforementioned operator level, the adjustment operation and registration for processing like weighing, e.g., including keying operations related to setting and registering of the preset number, the target weight, and the like. Further, the person to perform operation in the "installation adjustment level" is a technical service person of the manufacturer of the combination weighing apparatus 1. The operation details of the "installation adjustment level" correspond to, in addition to those of the aforementioned administration level, operation of the adjustments and the like required when installing the apparatus, e.g., including keying operations related to the setting of various operation parameters. An operation password, preassigned respectively to each person to perform operation, is input via the touch screen 30, and the range of available key operations is thereby set in accordance with the operation level to which they belong. Furthermore, each operation password is stored along with the corresponding operation level in the registration information storage unit 22a.

The preset number is a foodstuffs item that is preregistered and stored in the registration information storage unit 22a. For example, a product name, product weight, production performance (e.g., the number of weighments per minute), the operating conditions of the dispersion table 13 and radial troughs 14 . . . 14, the open and close timing conditions of the pool hoppers 15 . . . 15 and the weigh hoppers 16 . . . 16, the target weight, the weight upper limit, the weight lower limit, and the like are registered for each preset number.

To discriminate the person operating the touch screen 30 when running the combination weighing apparatus 1, an operator code is preassigned to each person who performs operations. Each operator code and the corresponding name are stored in the registration information storage unit 22a. The employee number, for example, is used as the operator code.

The display control unit 21b of the CPU 21 displays on the touch screen 30 various information, including memo information retrieved from the memory 22 by the retrieval control unit 21a.

If the operation restricting unit 21c of the CPU 21 inputs a signal to disable operation of the combination weighing apparatus 1, then it performs control to restrict operation of the combination weighing apparatus 1.

WORKING EXAMPLES

The following explains working examples of the memo information in the combination weighing apparatus 1.

Figure 2:
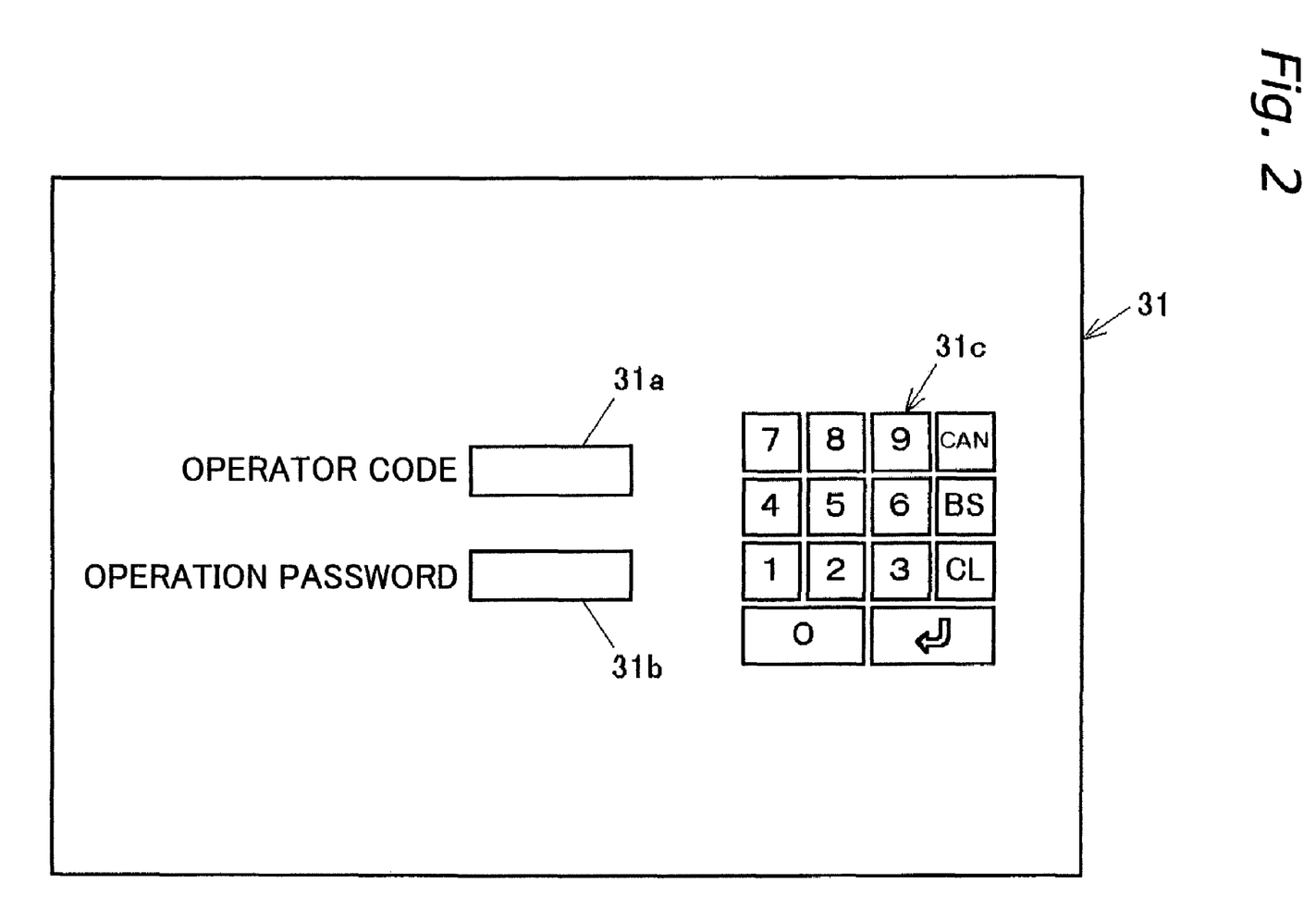
FIG. 2 depicts the initialization screen.

First, the operator of the combination weighing apparatus 1 turns on the main power supply switch (not shown) when starting operation, and then uses a numeric key pad 31c, displayed when needed, to respectively input the operator code and operation password assigned to the operator in an operator code input field 31a and an operation password input field 31b of an initialization screen 31, depicted in FIG. 2, displayed on the touch screen 30. Further, the operator operates the combination weighing apparatus 1 by operating keys displayed newly on the touch screen 30 via a menu screen 32, depicted in FIG. 3. In this case, inputting the operation password sets, in accordance with the inputted operation level of the operator, the range of available key operations (range of operations available for input).

In addition, the combination weighing apparatus 1 is configured so that, if an error, i.e., operational trouble as discussed later, occurs, an alarm sounds and operation stops. In this event, an error message is automatically displayed on the touch screen 30 of the combination weighing apparatus 1. An error message includes, for example, an error name such as "zero point error," "overload," "weigh hopper error," "failed transmission," and the like; the error location, the error symptoms, the probable cause of the error, and representative countermeasures.

The operator normally deals with the error based on the aforementioned display. From the perspective of subsequently continuing smooth production activity, it is advantageous in that case to record the details of the action taken, centering on the visual information, in the memo information as a message to the maintenance person-in-charge or the next operator to assume operation of the combination weighing apparatus 1, or as a reminder for oneself. Therefore, the following explains in greater detail the procedures for inputting, retrieving, and displaying memo information related to the aforementioned error, and memo information related to the state of the combination weighing apparatus 1 and the work progress status and the like.

Input of Memo Information

Figure 3:
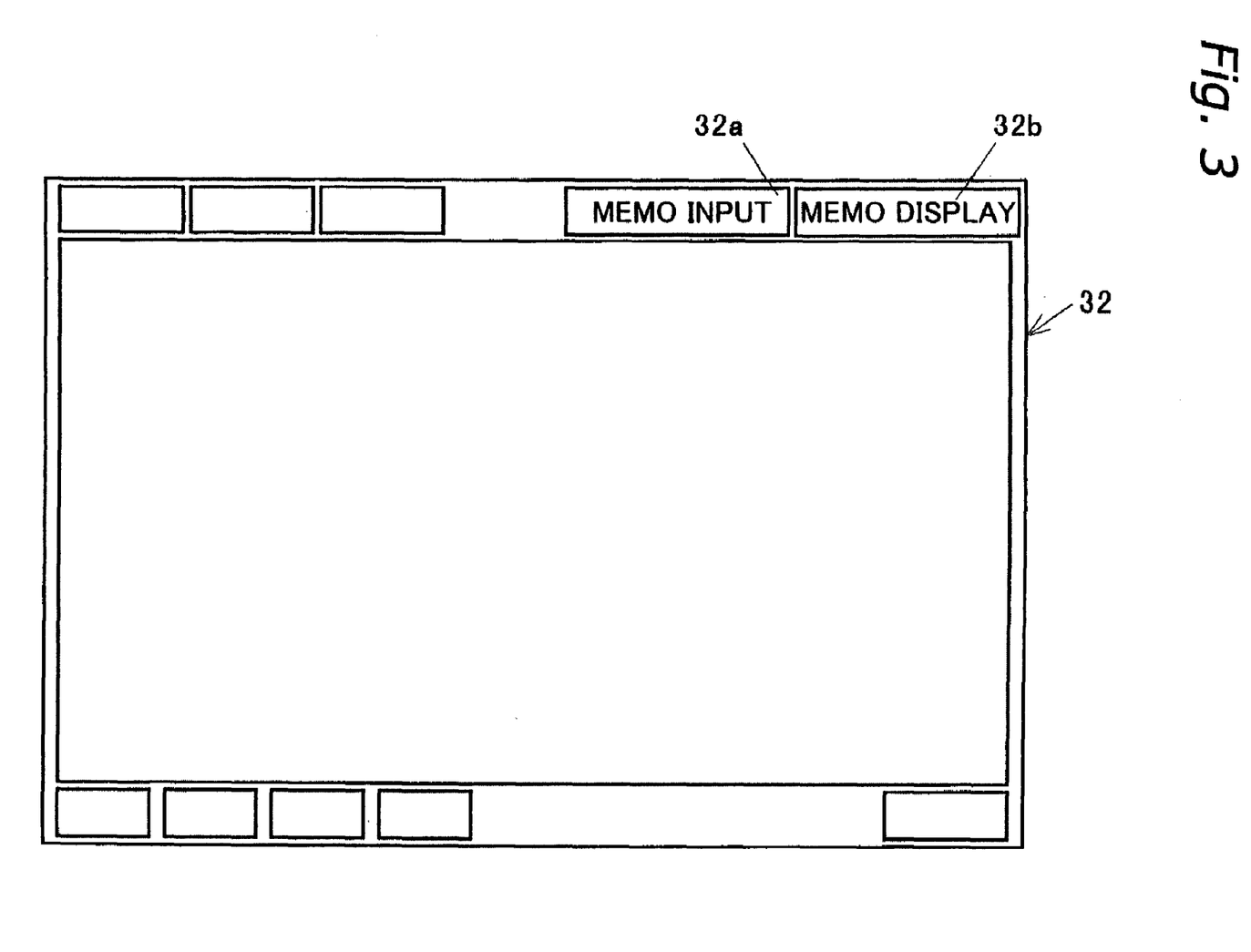
FIG. 3 depicts the menu screen.
Figure 4:
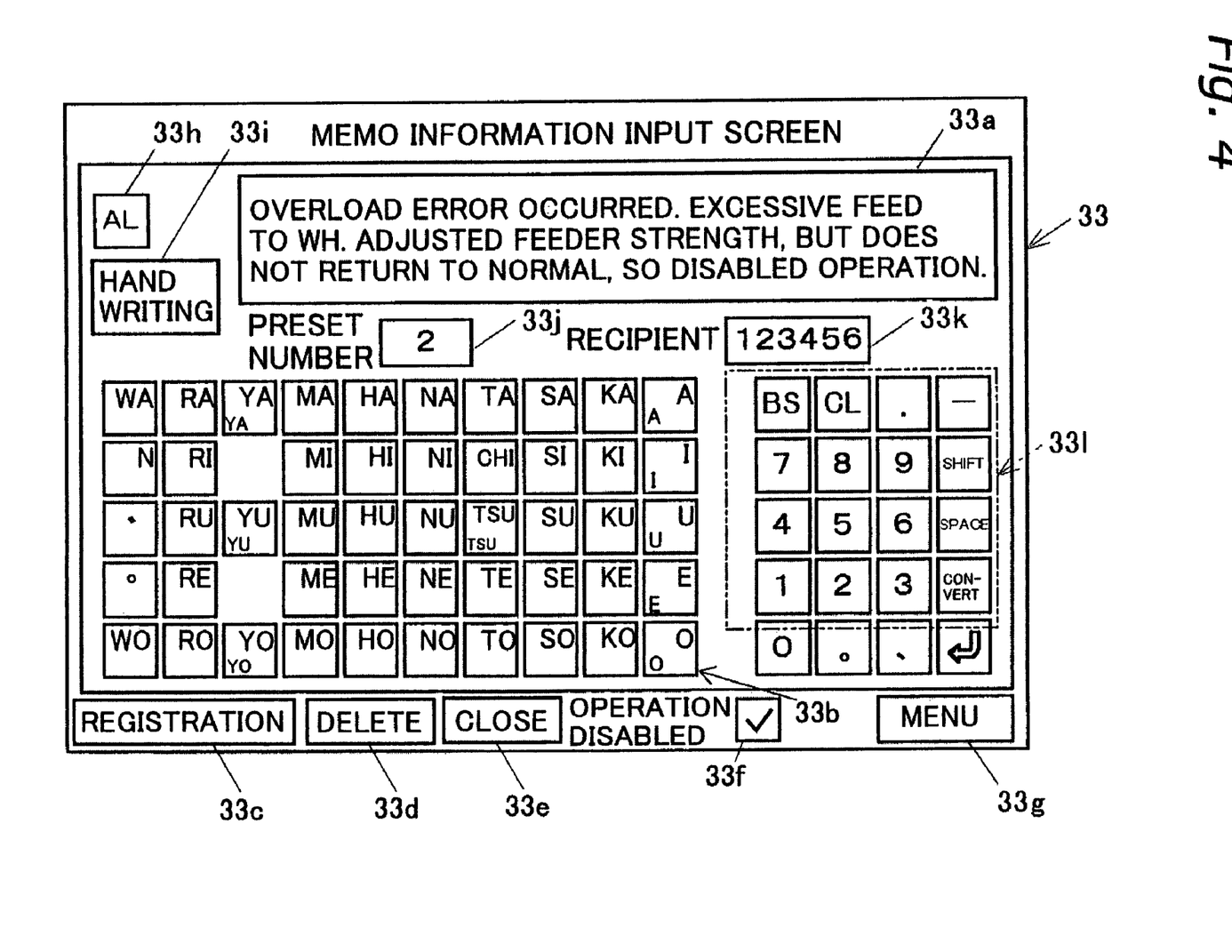
FIG. 4 depicts the memo information input screen when inputting character codes.

The operator touches a memo information input key 32a of the menu screen 32, shown in FIG. 3, and displays a memo information input screen 33, shown in FIG. 4. The memo information input screen 33 displays a memo information input area 33a for inputting the memo information, a keyboard 33b (the example in the figure is a 50 kana input keyboard in syllabary order) for inputting character codes, a registration key 33c, a delete key 33d, a close key 33e, a disable operation key 33f, a menu key 33g for returning to the menu screen 32, an alphabet input key 33h and a handwriting input key 33i for changing the input from the kana input shown in the figure to alphabetic input or handwriting input. Furthermore, a preset number input field 33j for inputting the preset number, and a recipient input field 33k for inputting the recipient if specifying the reader, i.e., the recipient, of the memo information, are displayed. Further, if the operator touches the recipient input field 33k, a recipient list 33l (details not shown), comprising names and operator codes is displayed within the chain link line, then the operator can input a recipient into the recipient input field 33k by selecting an appropriate recipient.

By touching a keyboard 33b in the memo information input screen 33, the operator can input as the memo information into the memo information input area 33a the error information, focusing on the visual information of the error name, the error cause, the error countermeasure, the post-countermeasure state, whether subsequent operation is allowable, and the like, as well as the state of the combination weighing apparatus 1 and the work progress status.

Further, the operator touches the operation disable key 33f particularly if the memo information is error information, the result of the countermeasure cannot resolve the error, and the operator judges that operation of the combination weighing apparatus 1 should be disabled. If the operation disable key 33f is touched, then a checkmark is displayed in the operation disable key 33f, the CPU 21 that input the touch signal sets the operation disabled flag to 1, and operation of the combination weighing apparatus 1 is thereby restricted. Furthermore, if the combination weighing apparatus 1 recovers to the normal state, then the operation disabled flag is set by changing it from 1 to 0.

In the example depicted in FIG. 4, memo information has been input about a situation where "an overload error has occurred, the cause is judged to be excessive supply to the WH (weigh hopper), the status did not return to normal despite measures to adjust the feeder strength, and it was judged necessary to disable operation because the cause was unclear." In addition, if the operation disable key 33f is touched, then a checkmark is displayed in the operation disable key 33f.

Further, if storing the memo information associated with a preset number, then the operator inputs the preset number ("2" in the example of the figure) in the preset number input field 33j. In addition, if specifying the reader of the memo information, the operator touches the recipient input field 33k, selects the corresponding recipient ("123456" in the example of the figure) from the displayed recipient list 33l, and thereby enters the recipient in the recipient input field 33k.

Figure 5:
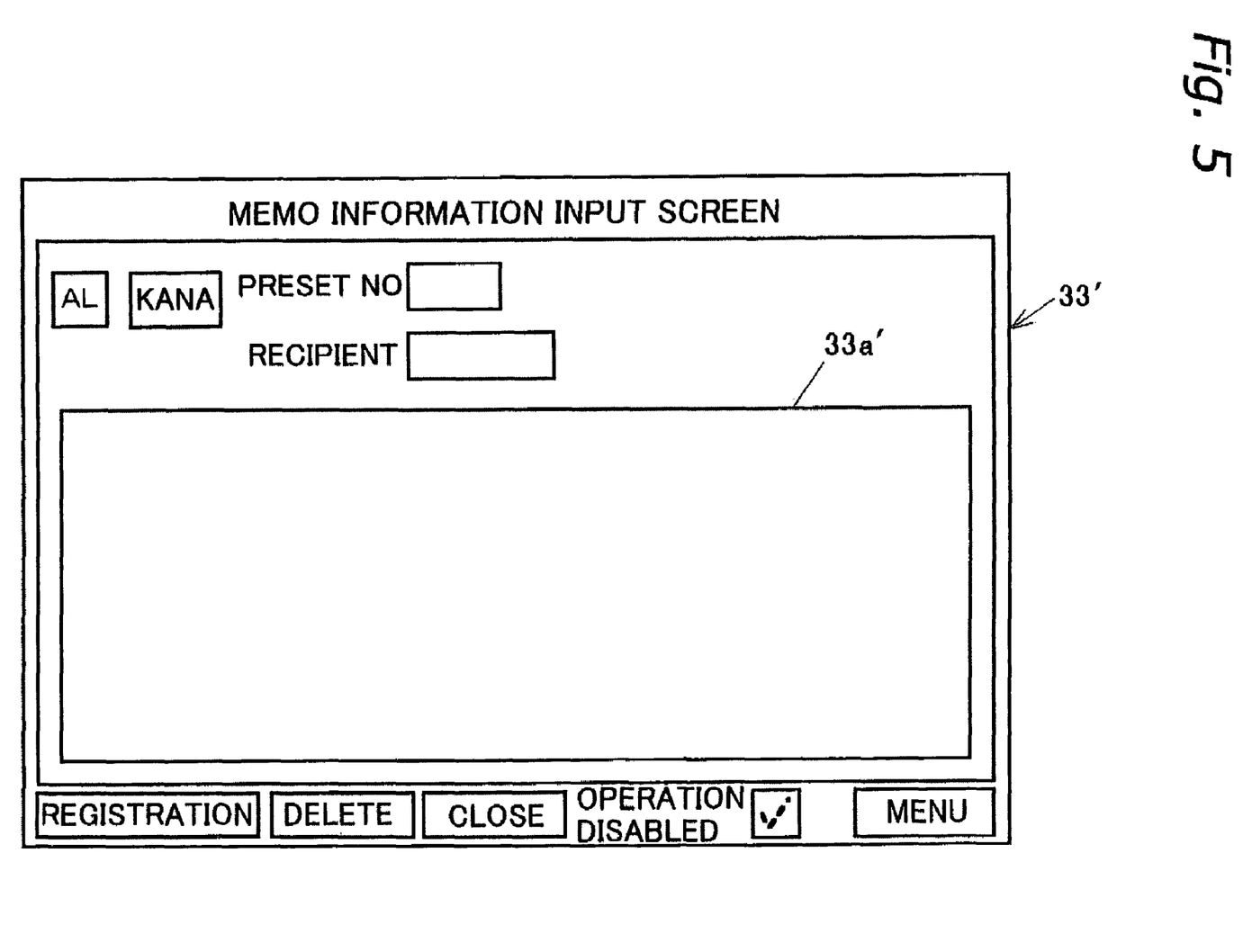
FIG. 5 depicts the memo information input screen when inputting by handwriting.

Although the operator has input the memo information using the keyboard 33b, the touch screen 30 also enables alphabetic input and handwriting input. For example, if performing input by handwriting, the operator touches the handwriting input key 33i of the memo information input screen 33, then the memo information input screen 33' shown in FIG. 5, is displayed on the touch screen 30 when inputting by handwriting, and the operator therefore should input the memo information into the memo information input area 33a' of the memo information input screen 33', using the handwriting input pen. Furthermore, the memo information that was input by handwriting is stored in the memo information storage unit 22b as an image file, such as a "TIFF" or a "JPEG" file and the like.

Thereby, when inputting memo information, the operator can select character code input using the keyboard or handwriting input, making it more convenient. Particularly if using the handwriting input function, the transmission of information is facilitated between persons who can recognize only a specific language. In such a case, there is no need for a function for inputting and displaying the specific language, making it advantageous from the perspective of cost. In addition, there is also the merit in that the memo information can be illustrated.

Further, when the inputting of the memo information is completed, the operator touches the registration key 33c (refer to FIG. 4), and uses the keyboard 33b to store the inputted memo information into the memo information storage unit 22b. This memo information is stored as a text file. At this time, the preset number and operator code of the recipient are also stored; in addition, the time when the memo information was entered, and the operator code and operation password of the operator, which was input via the initialization screen 31 when starting operation, are automatically stored.

However, if the inputted memo information is not to be stored in the memo information storage unit 22b, then the operator deletes the memo information by touching the delete key 33d. In addition, if the operator touches the close key 33e without touching the registration key 33c, then a message is displayed before the memo information input screen 33 closes asking whether to register the inputted memo information. The operator can reconfirm whether to register the memo information.

Configuration of the Memo Information Storage Unit

Figure 6:
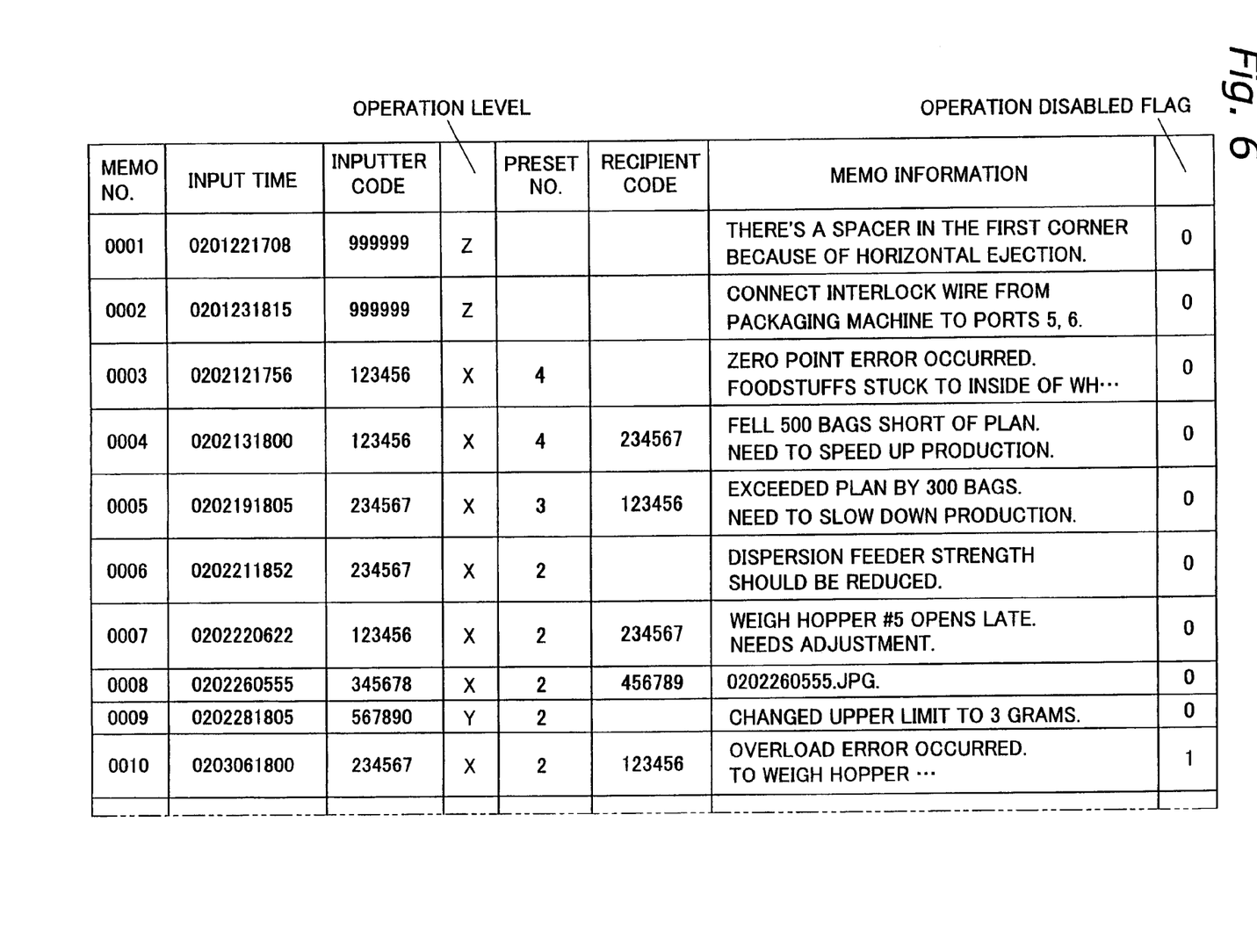
FIG. 6 is a table of the contents of the memory in the memo information storage unit.

FIG. 6 shows the content stored in the memo information storage unit 22b in tabular form. Furthermore, the usual configuration is to appropriately delete registered memo information that is no longer needed, and to actually store in the memo information storage unit 22b only the memo information that is not to be deleted. However, since there are various types of memo information, all registered memo information is stored without deleting any.

The memo information is assigned a memo number, which is a chronological serial number, and is associated with an input time; the inputter code, i.e., the operator code of the inputter; the operation level based on the operation password; the preset number; the recipient code, i.e., the operator code of the specified reader; the operation disabled flag; and the like. As an example, the memory information for the memory number 0008 shows that the operator of the "345678" operator code who belongs to the "X" operation level and was involved with the production work of the "2" preset number has specified the operator whose operator code is "456789" to be the reader, performed the input by handwriting on Feb. 26, 2002 at 5:55 a.m., and the memo information is stored as an image file with a filename assigned "0202260555.jpg."

Retrieval and Display of Memo Information

The next operator who assumes operation turns on the main power supply switch of the combination weighing apparatus 1, inputs the operator code and operation password assigned to the operator respectively in the operator code input field 31a and the operation password input field 31b of the initialization screen 31 displayed on the touch screen 30, the same as discussed earlier, whereupon the menu screen 32 is displayed on the touch screen 30.

Working Example 1

If no special control is performed when retrieving the memo information, then the retrieval control unit 21a of the CPU 21 retrieves all memo information stored in the memo information storage unit 22b. Furthermore, if there is corresponding memo information, then the display control unit 21b of the CPU 21 flashes a memo information display key 32b (refer to FIG. 3) of the menu screen 32. Thereby, the operator can recognize that there is memo information available to be read.

Figure 7:
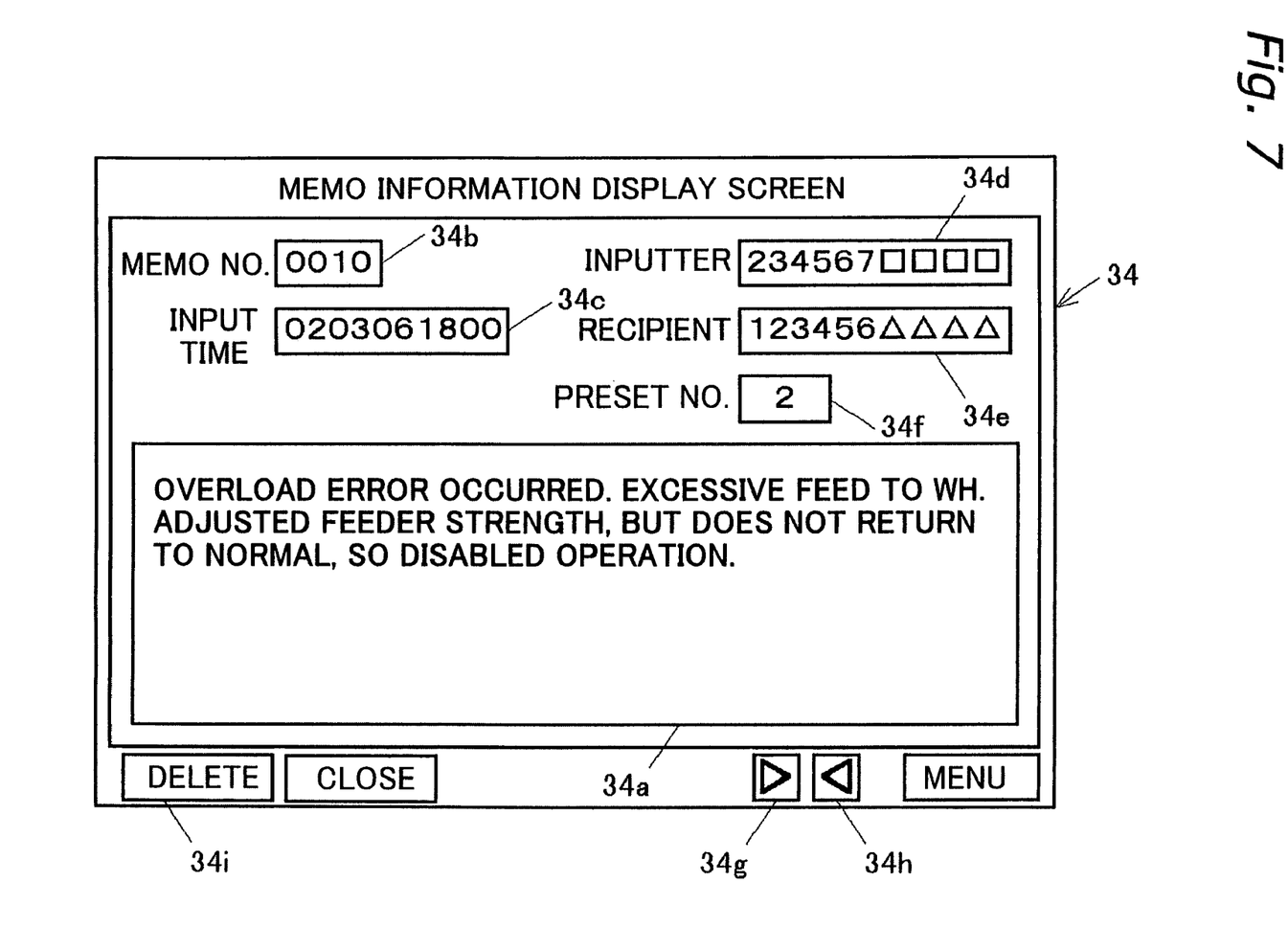
FIG. 7 depicts the memo information display screen.

Further, the operator retrieves a memo information display screen 34, shown in FIG. 7, by touching the flashing memo information display key 32b, and then reads the memo information displayed in a memo information display area 34a. Furthermore, the display control unit 21b of the CPU 21 automatically displays the memo number assigned to the memo information, the input time, the operator code and name of the inputter, the operator code and name of the recipient, and the preset number in a memo number display field 34b; an input time display field 34c; an inputter display field 34d; a recipient display field 34e; and a preset number display field 34f of the memo information display screen 34. The operator can therefore, for example, recognize who the inputter of the memo information is, whether this memo information concerns any preset number, and the like.

In addition, if there is a plurality of memo information files available for the operator to read, then the operator can display the desired memo information by touching a next key 34g or a back key 34h in the lower right hand side in the exemplary figure of the memo information display screen 34. Further, the operator can delete, from the memo information storage unit 22b, memo information displayed in the memo information display screen 34 by touching a delete key 34i. In addition, it is also acceptable to automatically delete memo information after a prescribed period of time has elapsed. This avoids the tedium of reading unnecessary memo information on the display, as well as the use of the memo information storage unit 22b for unnecessary memo information.

Thereby, the operator can read the memo information input by the previous operator, and the like, thus enabling a smooth handover. Moreover, because the touch screen 30 is provided and arranged proximate to the combination weighing apparatus 1, the operator can read the memo information while in full view of the combination weighing apparatus 1. If the memo information particularly relates to error information that focuses on the visual results of the combination weighing apparatus 1, then the effectiveness of conveying information is further enhanced. Furthermore, even if the reader is the one who input the memo information, it can help prevent a memory lapse of the inputter.

However, if there is no memo information available for that operator to read, then the memo information display key 32b does not flash, and there is therefore no risk that the operator will waste time touching the memo information display key 32b when there are no memo information files available for that operator to read. Furthermore, the constitution of the aforementioned screens 31, 32, 33, 33', 34 displayed in the touch screen 30 are only one example, and the present invention is not limited thereto.

Working Example 2

The retrieval control unit 21a of the CPU 21 can perform control so that, when retrieving memo information, the memo information is retrieved in accordance with the operation level of the reader of the memo information. In such a case, it is essential to input the operation password. Namely, when starting operation, the next operator inputs the operation password via the initialization screen 31, whereupon the retrieval control unit 21a of the CPU 21 recalls memo information, in accordance with the operation level to which the operator belongs, from among the memo information files stored in the memo information storage unit 22b. Furthermore, if there is corresponding memo information, then the CPU 21 flashes the memo information display key 32b of the menu screen 32. Thereby, the operator can recognize that there is memo information available for that operator to read. The operator retrieves the memo information display screen 34 by touching the flashing memo information display key 32b, and then reads the memo information displayed in the memo information display area 34a.

In such a case, the reader, such as an operator, can read memo information files in accordance with the operation level to which they themselves belong, as well as subordinate operation levels. For example, based on FIG. 6, the reader belonging to the X operation level (in this case, the working level) can read all memo information files corresponding to memo numbers 0003-0008, and 0010; a reader who belongs to the Y operation level (likewise, the administration level) can read memo information files corresponding to memo numbers 0003-0008, and 0010, as well as 0009; and a reader who belongs to the Z operation level (likewise, the installation adjustment level) can read all memo information files. Accordingly, the reader reads retrieved memo information specialized to the operation level to which they belong, thus eliminating tedium when reading.

However, if there is no corresponding memo information, then the memo information display key 32b does not flash, and there is no risk that the operator will waste time touching the memo information display key 32b when there is no memo information available for that operator to read.

Working Example 3

The retrieval control unit 21a of the CPU 21 can perform control when retrieving memo information so that memo information is retrieved in accordance with the preset number. In such a case, it is essential to input the preset number.

In other words, when starting operation, the next operator inputs a prescribed preset number as a series of normal key operations via the menu screen 32, whereupon the retrieval control unit 21a of the CPU 21 retrieves, in accordance with the aforementioned preset number, memo information from among the memo information files stored in the memo information storage unit 22b. Furthermore, if there is corresponding memo information, then the CPU 21 flashes the memo information display key 32b of the menu screen 32. Thereby, the operator can recognize that there is memo information available for that operator to read. The operator retrieves the memo information display screen 34 by touching the flashing memo information display key 32b, and reads the memo information displayed in the memo information display area 34a.

In such a case, because the operator reads retrieved memo information specialized to the relevant preset number, information useful to perform smooth production work can be effectively obtained.

However, if there is no corresponding memo information, then the memo information display key 32b does not flash, and there is no risk that the operator will waste time touching the memo information display key 32b when there is no memo information available for that operator to read.

Working Example 4

The retrieval control unit 21a of the CPU 21 can perform control so that, when retrieving memo information, memo information corresponding to the operator code is retrieved. In such a case, it is essential to input the operator code.

Namely, when starting operation, the next operator inputs the operator code via the initialization screen 31, whereupon the retrieval control unit 21a of the CPU 21 retrieves, from among the memo information files stored in the memo information storage unit 22b, memo information corresponding to the aforementioned operator code. Further, if there is corresponding memo information, then the CPU 21 flashes the memo information display key 32b of the menu screen 32. Thereby, the operator can recognize that there is memo information available for that operator to read. The operator retrieves the memo information display screen 34 by touching the flashing memo information display key 32b, and reads the memo information displayed in the memo information display area 34a.

In such a case, the operator reads retrieved memo information specialized to their own operator code, thereby eliminating tedium when reading. In addition, the inputter of the memo information can specify the reader of the memo information, e.g., if the inputter is an operator who inputs the error information of the combination weighing apparatus 1 and the reader is a service person, an extremely effective messaging means is provided. In addition, if the inputter of the memo information specifies themselves as the reader, then it serves an effective function as a reminder to avoid forgetting the memo information.

However, if there is no corresponding memo information, then the memo information display key 32b does not flash, and there is no risk that the operator will waste time touching the memo information display key 32b even when there is no memo information available for that operator to read.

Working Example 5

If there is memo information for which the operation disabled flag is set to 1 when retrieving memo information, then this message contains extremely critical information and, the retrieval control unit 21a of the CPU 21 retrieves the memo information with priority independent of the control based on the operation level, the preset number, and the operator code as explained in working examples 2 to 4, and makes that the memo information that should be displayed. In such a case, it is essential to touch the disable operation key 33f in the memo information input screen 33. In other words, when retrieving memo information, the retrieval control unit 21a of the CPU 21 which retrieves, from among the memo information files stored in the memo information storage unit 22b, prescribed memo information required as described in working example 2 through working example 4, including the most recent memo information, in which the operation disabled flag is 1. Further, if there is corresponding memo information, then the display control unit 21b of the CPU 21 flashes the memo information display key 32b of the menu screen 32.

Subsequently, if the memo information for which the operation disabled flag is 1 is displayed with highest priority, the operator can clearly recognize, when touching the memo information display key 32b, the contents of the error information and that operation is disabled. Moreover, if the disable operation key 33f is touched first, then the combination weighing apparatus 1 performs control so that the operation restricting unit 21c of the CPU 21 does not enter the operation mode, and therefore apparatus errors can be reliably avoided.

Other Embodiments

In the abovementioned embodiments, the memo information inputted by handwriting was stored as an image file in the memo information storage unit 22b. However, if this image file comprises handwritten characters, then it is also acceptable to convert the image file to a text file by OCR (optical character recognition apparatus) and then store it. Thereby, the stored memo information can be more flexibly utilized.

In addition, it is also acceptable to connect a scanner as a means for inputting memo information into the control unit 20 in the abovementioned embodiments. Thereby, if, for example, the location of an error is additionally written onto a printed drawing and that drawing is input as an image file via a scanner, then more accurate memo information is provided.

In addition, it is also acceptable to connect to the control unit 20 in the above-mentioned embodiments a voice input/output apparatus provided with a microphone, speaker, and the like, so that the memo information is input and output via that voice input/output apparatus, thereby enhancing convenience.

In addition, in the abovementioned embodiments, the touch screen 30 was used as the units for the operation input means and the memo information input means. However, it is also acceptable to use a combination of a regular keyboard and a regular display. Thereby, operational advantages similar to the abovementioned embodiments are obtained.

In addition, in the abovementioned embodiments, the preset number input field 33j was provided when inputting memo information, and a preset number corresponding to the preset number input field 33j was input. However, it is also acceptable to automatically store the preset numbers that the operator has retrieved to date for production work. Thereby, the time used for inputting can be saved.

In addition, in the abovementioned embodiments, the memo information display key 32b of the menu screen 32 was flashed if there was memo information available for the operator to read. However, it is also acceptable to display the memo information display key 32b on the screen only if there is memo information available for that operator to read. Thereby, the operator can recognize that there is memo information available for that operator to read.

In addition, it is also possible to expand the abovementioned embodiments so that, if memo information is error information that particularly includes a judgment of operation disablement, then the touch signal of the disable operation key or a registration key, or the memo information can be assigned a unique machine code of the combination weighing apparatus 1 and then transmitted to the computer of the facility's equipment maintenance department via a LAN such as an Ethernet LAN and the like, or assigned the manufacturer's serial number of the combination weighing apparatus 1 and then e-mailed to the manufacturer. Thereby, information and awareness of the problem can be shared in a timely fashion, leading to prevention of a recurrence of the problem.

In addition, in the abovementioned embodiments, the retrieval control unit 21a of the CPU 21 performed control as described in working example 2 through working example 5 when retrieving memo information. However, the present invention is not limited thereto, and it is also possible to perform control by appropriately combining the various working examples.

Further, the abovementioned embodiments explained a combination weighing apparatus 1 in which the present invention was applied. However, the present invention is also applicable to a variety of other foodstuffs processing apparatuses, such as an automatic weighing apparatus, a bag manufacturing and packaging apparatus, a case packing apparatus, a checkweigher, a seal checker, and an X-ray inspection apparatus.

INDUSTRIAL FIELD OF APPLICATION

Use of the foodstuffs processing apparatus according to the present invention eliminates the need for conventional sticky-type memo sheets that are stuck onto the operation unit, and the like. The present invention is broadly suited to the technical field of a variety of foodstuffs processing apparatuses.

The invention claimed is:

1. A foodstuffs processing apparatus that performs prescribed processing related to foodstuffs, the foodstuffs processing apparatus comprising:
a foodstuffs processing unit configured and arranged to perform a prescribed food processing operation;
an operation inputting unit configured and arranged to input operation related to said operation of said foodstuffs processing unit;

a memo information input unit configured and arranged to input memo information;

a memo information storage unit configured and arranged to store the memo information inputted through said memo information input unit;

a memo information retrieval unit configured and arranged to retrieve said memo information stored in said memo information storage unit; and a memo information display unit configured and arranged to display said memo information retrieved by said memo information retrieval unit, said memo information storage unit being further configured and arranged to associate and store said memo information and an identifier that specifies to whom said memo information is directed, and said memo information retrieval unit being further configured and arranged to retrieve said memo information corresponding to said identifier.

2. The foodstuffs processing apparatus as recited in claim 1, wherein said memo information input unit is further configured and arranged to allow input in a character code input function and a handwriting input function.

3. The foodstuffs processing apparatus as recited in claim 1, wherein said memo information storage unit is further configured and arranged to associate and store as said memo information at least one of the time, error symptoms, error cause, error handling status, and apparatus state after error handling.

4. The foodstuffs processing apparatus as recited in claim 3, wherein said memo information storage unit is further configured and arranged to associate and store said memo information and post-error-handling operation enable/disable information;

said foodstuff processing apparatus further comprises:

an operation restricting unit configured and arranged to restrict operation if operation disabled information is stored.

5. The foodstuffs processing apparatus as recited in claim 1, wherein, said memo information storage unit is further configured and arranged to associate and store said memo information and an operation level that specifies a range in which operations of said foodstuffs processing unit can be input in said operation inputting unit; and said memo information retrieval is further configured to retrieve memo information corresponding to said operation level.

6. The foodstuffs processing apparatus as recited in claim 1, wherein said memo information storage unit is further configured and arranged to associate and store said memo information and a preset number that specifies a foodstuffs item to be processed by said foodstuffs processing unit; and said memo information retrieval unit is further configured to retrieve memo information corresponding to said preset number.

\* \* \* \* \*